E. H. KUHN.
DEVICE FOR TEACHING ARITHMETIC.
APPLICATION FILED OCT. 24, 1917.

1,267,326.

Patented May 21, 1918.
2 SHEETS—SHEET 1.

INVENTOR
Edwin H. Kuhn
BY H. M. Kilpatrick
ATTORNEY

E. H. KUHN.
DEVICE FOR TEACHING ARITHMETIC.
APPLICATION FILED OCT. 24, 1917.

1,267,326.

Patented May 21, 1918.
2 SHEETS—SHEET 2.

INVENTOR
Edwin H. Kuhn
By H. M. Kilpatrick
ATTORNEY

UNITED STATES PATENT OFFICE.

EDWIN H. KUHN, OF NEW YORK, N. Y.

DEVICE FOR TEACHING ARITHMETIC.

1,267,326.  Specification of Letters Patent.  Patented May 21, 1918.

Application filed October 24, 1917. Serial No. 198,303.

*To all whom it may concern:*

Be it known that I, EDWIN H. KUHN, a citizen of the United States of America, residing in the city, county, and State of New York, have invented a new and useful Device for Teaching Arithmetic, of which the following is a specification.

This invention relates to educational devices and especially to devices particularly adapted for drills, contests and games suitable for teaching arithmetic or other subjects.

An object of the invention is to provide a device in which successive problems may be presented, the player or contestant being able, on the selection of the proper answer, to actuate associated means for bringing about the presentation of another problem. In this way it is easily possible to note the length of time necessary for solving some or all of the problems of the device.

To this end, I have provided a device comprising disks on which the elements of the problems may be brought together, said disks having, for relatively moving the same to present new problems, a number of moving means, each means being designated by an answer corresponding to the problem that may be presented, but only the means corresponding to the problem that is presented at a given time being operative at such time, so that it is necessary to select the correct answer and moving means corresponding to each problem before a new problem can be presented.

These and other objects and capabilities will appear as the description proceeds; and, while herein I have described an embodiment of the invention as applied to a device for teaching arithmetical addition of integers, the invention is not limited to these or even to mathematical operations, nor to the details of construction shown, since the details of construction and operation may be greatly varied without departing from the scope of the invention as claimed.

In the accompanying drawings, showing by way of example, one of many possible embodiments of the invention, Figure 1 is a face view of the assembled device;

Figure 1:
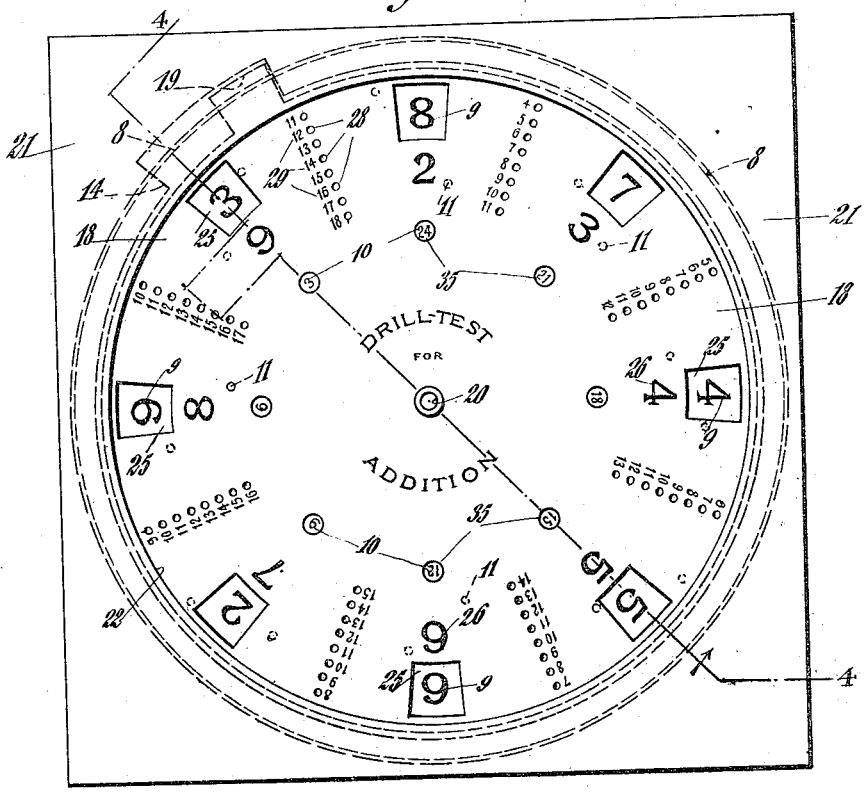
Figure 4:
Fig. 4 is a sectional view taken on the line 4—4 of Fig. 1.
Figure 5:
Fig. 5 shows a side view of a stylus for operating the device.

Referring more particularly to the drawing, the device is shown comprising a base card 5, on which is immovably mounted a spacing card 6 provided with a central, circular opening 7, in which opening is rotatably disposed a rotatable disk 8 provided with an annular series of element-figures or element numerals 9 disposed equal angles apart. On said disk are also disposed equiangularly apart a series of counting numbers 10, and a plurality of answer holes 11 each having the same angular position on the disk relative to the element-figure to which it corresponds and being disposed a characteristic distance from the center of the disk, as will be explained.

Upon the spacing card 6 is secured a limiting card 14 provided with an intra-marginal opening 15 the edges of which engage over and retain in place the edges of the rotatable disk 8. Communicating with the intra-marginal opening 15 is a lateral opening 16.

Upon the rotatable disk is disposed an oscillatory disk 18 provided with a lateral lug or tongue 19 engaging in said lateral opening 16 and limiting the oscillatory movement of the disk to an angle substantially equal to the angle between the said element-figures. An eyelet 20 or other suitable means holds the disks concentric with each other and upon the base card and permits easy relative rotatory movement of these parts.

Upon the outer face of the limiting card is secured a cover card 21 provided with a circular intra-marginal opening, the edges 22 of which engage over the edges of the oscillatory disk and hold them in proper position.

It is noted that the spacing card 6 is not necessary for operativeness but may be provided or not as desired.

The oscillatory disk is provided with an annular series of windows 25 which may be of any suitable or desirable number, and through which the element-figures 9 are exposed. Adjacent to each window is an element-numeral or character 26, said element-numeral 26 and the element figure exposed in the adjacent window constituting the elements or terms of the problem to be solved.

Associated with each window is a radial row of answer perforations 28, and adjacent to each perforation is an answer numeral or character 29 representing the answers resulting from all the different combinations which will be produced between the associated element-numeral 26 and whatever element-figure 9 may be exposed in the associated window.

The oscillating disk is normally in the position of its forward limit of movement (Fig. 1), with element figures exposed in the windows. In this position no answer hole 11 is in register with its answer perforation; but the position of each answer hole 11 corresponding to any element-figure that may be exposed at the forward position of the oscillatory disk, is such that it will, when the oscillatory disk is oscillated backwardly to the position of Fig. 2, register with one of the answer perforations 28 associated with such window, and this perforation is the one which is designated by the answer numeral designating the answer resulting from the combination of the associated element-numeral and the element-figure that was exposed before said backward oscillation. At this backward position, at which such registration takes place, a new element-figure is exposed at the window and the point 30 of the wire end 31 of the stylus 32 may be inserted into the registering perforations and both disks drawn forward for the next operation, in which position the lug 19 occupies the position shown in Fig. 1.

The point 30 of the stylus is offset by the lateral bend 34 for convenience in manipulation and to prevent the exerting of too great a pressure by said point upon the disks and base card during the operation of the device.

The oscillatory disk is provided with a series of counting openings 35 through which the counting numbers 10 are exposed for counting the number of operations performed.

The operation of the device is as follows:

One of the windows 25 and its associated numerals is selected for the drill, and the rotatable disk moved as will be explained until the counting numeral "1" appears in the counting opening 35 below the selected window. In this position, there will appear an element-figure in the window, the lug 19 will be in forward position (Fig. 1) and no answer hole 11 will register with any answer perforation. The pupil then considers combining or adding the numbers exposed in and by the window and selects the answer from the row of associated answer numerals. He then places the point of his stylus in the perforation designated by such answer numeral and moves the oscillatory disk back to the position of Fig. 2 and a new element figure will appear in the window. If the right answer has been selected, the point of the stylus will, when the oscillatory disk has moved to the position of Fig. 2, slip into the registering hole 11 and the rotatable disk may be moved forward the distance of the oscillation. If, however, the right answer has not been selected the stylus will not find the answer hole and the rotatable disk cannot be rotated forwardly.

Figure 2:
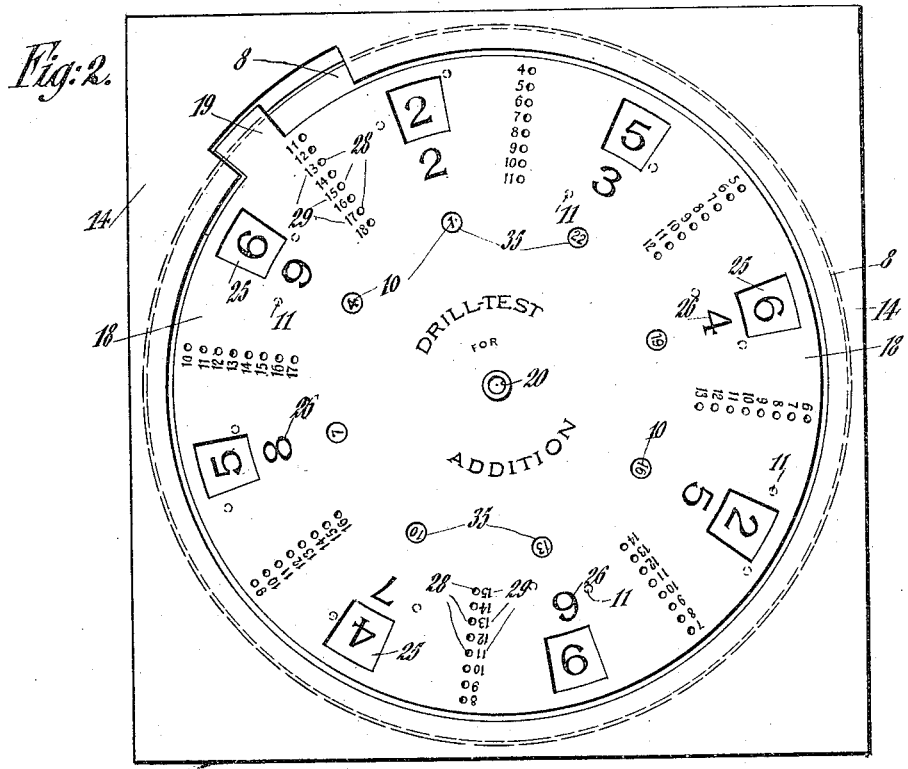
Fig. 2 is a face view of the device with the cover frame-card removed and showing the disks in a different relation.
Figure 3:
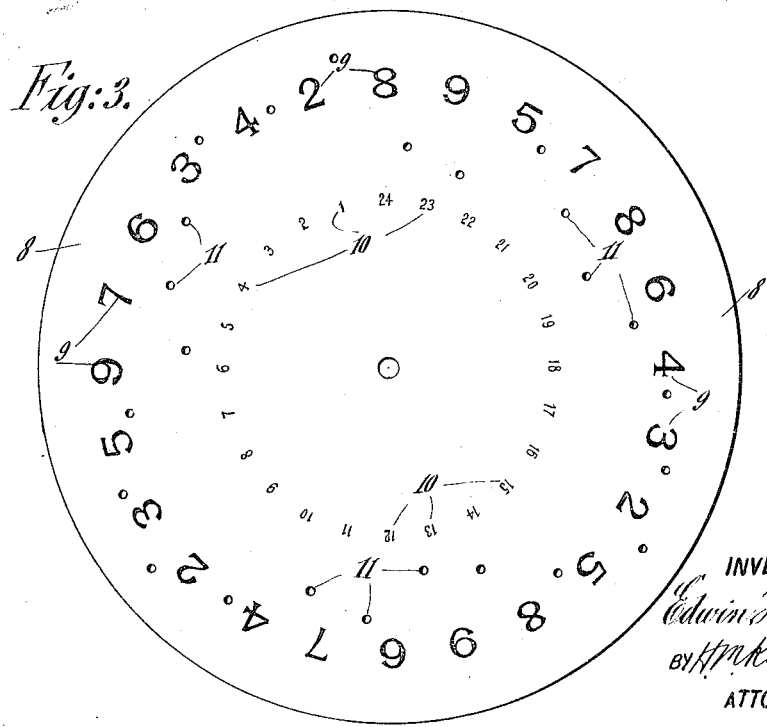
Fig. 3 is a face view of the rotatable disk of the device.

When a new problem is presented and the parts brought to the position of Fig. 1, the process is repeated.

It is, therefore, evident that the rotatable disk can only be moved forwardly as often and as fast as the right answers are selected.

The counting numbers exposed in the openings 35 indicate when a complete rotation of the rotatable disk has been made or how many problems have been solved within the time of the drill.

When the device is adapted for multiplication, multiplier and multiplicand numerals are substituted for said element numeral and figures, and product numerals are used to designate the answer perforations.

Instead of the element and answer figures and characters being numerals, they may represent any associated ideas and the ideas resulting from such association.

I claim as my invention:

1. In a device of the character described, the combination of relatively movable parts adapted to present problems for solution, and a plurality of means for moving said parts to present a new problem, only one of which is operative for the positions of the parts when the problem is set up.

2. In an apparatus of the character described, the combination of a device adapted to present successively a plurality of different problems; and a plurality of means for operating the device to present new problems, certain of said means being operative and certain of them being inoperative at a given time.

3. In a device of the character described, the combination of a pair of relatively movable parts adapted to be placed in different relations to present different problems; characters representing respectively the answers to said problems; and a plurality of means, one associated with each character, for moving said parts to present new problems, only the means associated with the answer of the problem at the time presented being at that time operative.

4. In an apparatus of the character described, the combination of a device adapted to present a plurality of different problems to be solved; a plurality of answer characters representing respectively the answers to said problems; and a pluraliy of means, one associated with each of said characters, for operating said device to present new problems, only that one of said means associated with the answer character of the problem at that time presented being operative to present a new problem.

5. In a device of the character described, the combination of a reciprocatory member adapted for limited reciprocatory movement and provided with a series of element-characters, answer-characters associated with each element character, and answer perforations designated respectively by the answer characters; and a movable member provided with element-figures adapted to be successively brought into proximity with each element-character, and provided with holes corresponding to said element-figures respectively, each hole being adapted to register with the perforations designated by the answer character representing the answer obtained by combining its associated element-character with the element figure corresponding to such hole.

6. In a device of the character described, the combination of a reciprocatory member adapted for limited reciprocatory movement and provided with a series of element-characters, answer-characters associated with each element character, and answer perforations designated respectively by the answer characters; and a movable member provided with element-figures adapted to be successively brought into proximity with each element-character, and provided with holes corresponding to said element-figures respectively, each hole being adapted, after a backward movement of the reciprocatory member, to register with the perforation designated by the answer character representing the answer obtained by combining its associated element-character with the element figure corresponding to such hole.

7. In a device of the character described, the combination of a reciprocatory member adapted for limited reciprocatory movement and provided with a series of element-characters, answer characters associated with each element character, and answer perforations designated respectively by the answer characters; and a movable member provided with element figures adapted to be successively brought into proximity to each element-character, and provided with holes corresponding to said element-figures respectively, each hole being adapted, after a backward movement of the reciprocatory member, to register with the perforation designated by the answer character representing the answer obtained by combining its associated element-character with the element figure corresponding to such hole, and which was in closest proximity to such element-character before said backward movement.

8. In a device of the character described, the combination of an oscillatory disk adapted for limited oscillatory movement and provided with a series of element-characters, a group of answer characters associated with the element characters and answer perforations designated respectively by said answer-characters; and a rotatable disk mounted for rotation concentric with said oscillatory disk and provided with element figures adapted to be brought successively into proximity with each element-character, and provided with shoulders corresponding to each element-figure, each shoulder being adapted, after a backward oscillation of the oscillatory disk, to register with the perforation designated by the answer character representing the answer obtained by combining its associated element-character with the element-figure corresponding to such shoulder and which was in closest proximity to said element-character just before said backward oscillation, whereby said shoulders may be engaged for moving said rotatable disk.

9. In a teaching device, the combination of a base, an oscillatory disk mounted thereon for limited oscillatory movement and provided with a circular series of windows, an element-numeral associated with each window, a group of answer numerals associated with each element-numeral and a radial group of answer perforations designated respectively by said answer-numerals; and a rotatable disk disposed under and concentric with the oscillatory disk and provided with a series of element-figures adapted to be successively exposed at said windows, and with a hole corresponding to each element figure; each hole being adapted, after a backward oscillation of the oscillatory disk, to register with the perforation designated by the answer numeral representing the result of combining its associated element-numeral with the element-figure corresponding to such hole.

10. In a teaching device, the combination of a base, an oscillatory disk mounted thereon for limited oscillatory movement and provided with a circular series of windows, an element-numeral associated with each window, a group of answer-numerals associated with each element-numeral and a radial group of answer perforations designated respectively by said answer-numerals; and a rotatable disk disposed under and concentric with the oscillatory disk and provided with a series of element-figures adapted to be successively exposed at said windows, and with a hole corresponding to each element figure; each hole being adapted, after a backward oscillation of the oscillatory disk, to register with the perforation designated by the answer numeral representing the result of combining its associated element-numeral with the element-figure corresponding to such hole and which was, just before said backward oscillation exposed in the window associated with such element-numeral, whereby said hole may be engaged for moving said rotatable disk on the next forward oscillation of the oscillatory disk.

11. In a teaching device, the combination of a base, an oscillatory disk mounted thereon for limited oscillatory movement and provided with a circular series of windows, an element-numeral associated with each window, a group of answer numerals associated with each element-numeral and a radial group of answer perforations designated respectively by said answer-numerals; and a rotatable disk disposed under and concentric with the oscillatory disk and provided with a series of element-figures adapted to be successively exposed at said windows, and with a hole corresponding to each element figure; each hole being adapted, after a backward oscillation of the oscillatory disk, to register with the perforation designated by the answer numeral representing the result of combining its associated element-numeral with the element-figure corresponding to such hole; said oscillatory disk being also provided with a circular series of counting windows, said rotatable disk being provided with a series of counting numbers, one for each element-figure, adapted to be successively exposed in said counting windows.

12. In a device for teaching arithmetic, the combination of a base card; a rotatable disk mounted on said card; a limiting card mounted on said base card; and provided with a central opening and a lateral opening communicating with the central opening, the edges of the central opening overlapping the edges of said disk; and an oscillatory disk disposed on the rotatable disk concentric therewith and provided with a peripheral lug engaging in said lateral opening for limiting the oscillatory movement of the oscillatory disk, said oscillatory disk being provided with a series of windows, an element numeral associated with each window, a series of answer-numerals associated with each window and associated element-numeral and a radial group of answer perforations designated respectively by said answer numerals; said rotatable disk being provided with a series of element-figures adapted to be successively exposed in said windows, and with a hole corresponding to each element-figure, each hole being adapted after a backward oscillation of the oscillatory disk, to register with the perforation designated by the answer numeral representing the result of combining its associated element numeral with the element-figure corresponding to such hole; and a cover card secured on said limiting card and provided with an intra-marginal opening the edges of which cover the edges of the oscillatory disk.

13. In a device for teaching arithmetic, the combination of a base card; a spacing card fixed on the front face of the base card and provided with a large intra-marginal opening; a rotatable disk in said opening; a limiting card mounted on said spacing card and provided with a central opening and a lateral opening communicating with the central opening, the edges of the central opening overlapping the edges of said disk; and an oscillatory disk disposed on the rotatable disk concentric therewith and provided with a peripheral lug engaging in said lateral opening for limiting the oscillatory movement of the oscillatory disk, said oscillatory disk being provided with a series of windows, an element numeral associated with each window, a series of answer numerals associated with each window and associated element-numeral, and a radial group of answer perforations designated respectively by said answer numerals; said rotatable disk being provided with a series of element-figures adapted to be successively exposed in said windows, and with a hole corresponding to each element-figure, each hole being adapted, after a backward oscillation of the oscillatory disk, to register with the perforation designated by the answer numeral representing the result of combining its associated element numeral with the element figure corresponding to such hole, which element figure was, just before said backward oscillation, exposed in the window associated with such element-numeral and answer-numeral; and a cover card secured on said limiting card and provided with an intra-marginal opening the edges of which cover the edges of the oscillatory disk.

E. H. KUHN.

Copies of this patent may be obtained for five cents each, by addressing the "Commissioner of Patents, Washington, D. C."